US 008010610B2

(12) United States Patent (10) Patent No.: US 8,010,610 B2
Bumiller (45) Date of Patent: Aug. 30, 2011

(54) HANDHELD ELECTRONIC DEVICE PROVIDING ASSISTED ENTRY OF CONTACT INFORMATION, AND ASSOCIATED METHOD

(75) Inventor: George Baldwin Bumiller, Ramsey, NJ (US)

(73) Assignee: Research In Motion Limited, Waterloo, Ontario (CA)

( * ) Notice: Subject to any disclaimer, the term of this patent is extended or adjusted under 35 U.S.C. 154(b) by 992 days.

(21) Appl. No.: 11/196,363

(22) Filed: Aug. 3, 2005

(65) Prior Publication Data

US 2007/0029373 A1 Feb. 8, 2007

(51) Int. Cl.
*G06F 15/16* (2006.01)
(52) U.S. Cl. ... 709/206; 715/234; 715/810; 379/355.05; 345/168
(58) Field of Classification Search .................. 709/219, 709/206; 715/234, 810; 379/355.05; 345/168
See application file for complete search history.

(56) References Cited

U.S. PATENT DOCUMENTS

| | | | | |
|---|---|---|---|---|
| 5,600,556 | A * | 2/1997 | Takenaka | 715/234 |
| 5,737,394 | A * | 4/1998 | Anderson et al. | 379/88.11 |
| 5,982,351 | A * | 11/1999 | White et al. | 715/810 |
| 6,208,339 | B1 * | 3/2001 | Atlas et al. | 715/780 |
| 6,489,950 | B1 | 12/2002 | Griffin et al. | |
| 6,575,376 | B2 * | 6/2003 | Yu | 235/494 |
| 6,829,607 | B1 * | 12/2004 | Tafoya et al. | 1/1 |
| 7,187,932 | B1 * | 3/2007 | Barchi | 455/445 |
| 7,218,727 | B1 * | 5/2007 | Kim | 379/355.05 |
| 7,254,569 | B2 * | 8/2007 | Goodman et al. | 707/1 |
| 7,262,761 | B1 * | 8/2007 | Duarte et al. | 345/168 |
| 7,426,496 | B2 * | 9/2008 | Kristjansson | 706/10 |
| 2003/0174125 | A1 * | 9/2003 | Torunoglu et al. | 345/168 |

OTHER PUBLICATIONS

"AddressDoctor Newsletter" [Online] Apr. 2002, XP002410860 Retrieved from the Internet on Dec. 6, 2006 from URL: http://www.addressdoctor.com/en/news_events/AD_newsletter_April%202002_EN.html>.
Greiner et al.: "Kundenverwaltung: PLZ+Ort", Google Groups, [Online] Mar. 8, 2002 XP002410681 Retrieved from the Internet on Dec. 4, 2006 from URL: http://basicworld.public/vb.datenbank.
"Add in form directory product info" [Online] Jul. 9, 2003, XP002410862, Retrieved from the Internet on Dec. 4, 2006 from URL: http://web.archive.org/web/20040708080458/http://www.postcodeanywhere.co.uk/products/desktop.aspx>.
"Postcode Anywhere Desktop" [Online] Jul. 8, 2004, XP002410863, Retrieved from the Internet on Dec. 4, 2006 from URL: http://web.archive.org/web/20040708080458/http://www.postcodeanywhere.co.uk/products/desktop.aspx>.

* cited by examiner

*Primary Examiner* — Krista M Zele
*Assistant Examiner* — Andrew Georgandellis
(74) *Attorney, Agent, or Firm* — Novak Druce + Quigg LLP (57) ABSTRACT

A method of facilitating the entry of information for a contact to be stored by an address book application of a handheld electronic device, wherein the information is entered into a plurality of fields. The method includes receiving first information in a first one of the fields, and determining whether the first information can be used to determine second information for entry in one of the fields. If it is determined that the first information can be used to determine the second information, the method includes entering the second information in either the first one of the fields or another one of the fields. Also, a handheld electronic device having one or more routines that are adapted to implement the method described above.

18 Claims, 10 Drawing Sheets

```
New Contact                              —150
┌─────────────────────────────────────┐
│ Salutation: Dr.                     │
│ First: John                         │
│ Last: Smith                         │
│ Email:                              │
│ Company:                            │
│ Title:                              │
│ Work:                               │
│ Home:                               │
│ Mobile:                             │
│ Pager:                              │
│ Fax:                                │
│ Pin:                                │
│ Address 1: 123 Main Street          │
│ Address 2:                          │
│ City: Waterloo                      │
│ State/Province: ON                  │
│ Zip/Postal Code:                    │
│ Country:                            │
└─────────────────────────────────────┘
```

FIG.5

```
New Contact                              —150
┌─────────────────────────────────────┐
│ Salutation: Dr.                     │
│ First: John                         │
│ Last: Smith              160        │
│ Email:                              │
│ Co ┌──────────────────────────┐     │
│ Tit│ Do you wish to enter     │     │
│ Wo │ Canada in the country field? │ │
│ Ho │                          │     │
│ Mo │   ┌─────┐    ┌─────┐    │     │
│ Pa │   │ Yes │    │ No  │    │     │
│ Fa │   └─────┘    └─────┘    │     │
│    └──────────────────────────┘     │
│ Pin:                                │
│ Address 1: 123 Main Street          │
│ Address 2:                          │
│ City: Waterloo                      │
│ State/Province: ON                  │
│ Zip/Postal Code:                    │
│ Country:                            │
└─────────────────────────────────────┘
```

New Contact — 150

155 {
Salutation: Dr.
First: John
Last: Smith
Email:
Company:
Title:
Work:
Home:
Mobile:
Pager:
Fax:
Pin:
Address 1: 123 Main Street
Address 2:
City: Waterloo
State/Province: ON
Zip/Postal Code:
Country: Canada

*FIG. 6*

New Contact — 150

155 {
Salutation: Mrs.
First: Mary
Last: Jones
Email:
Company:
Title:
Work: +44-XXXX-XXXX
Home:
Mobile:
Pager:
Fax:
Pin:
Address 1:
Address 2:
City:
State/Province:
Zip/Postal Code:
Country:

*FIG. 7*

New Contact — 12, 150

Salutation: Dr.
First: John
Last: Smith
Email:
Co[mpany]
Tit[le]
Wo[rk]
Ho[me]
Mo[bile]
Pa[ger]
Fa[x]
Pin:
Address 1: 123 Main Street
Address 2:
City: Waterloo
State/Province: ON
Zip/Postal Code:
Country: Canada

155

160 — Do you wish to enter United Kingdom in the country field?  [Yes]  [No]

*FIG.8*

New Contact — 12, 150

Salutation: Mrs.
First: Mary
Last: Jones
Email:
Company:
Title:
Work: +44-XXXX-XXXX
Home:
Mobile:
Pager:
Fax:
Pin:
Address 1:
Address 2:
City:
State/Province:
Zip/Postal Code:
Country: United Kingdom

```
┌─────────────────────────────────┐
│  New Contact                ─150│
├─────────────────────────────────┤
│ Salutation: Mrs.                │
│ First: Emily                    │
│ Last: Williams                  │
│ Email:                          │
│ Company:                        │
│ Title:                          │
│ Work:                           │
│ Home:                           │
│ Mobile:                         │
│ Pager:                          │
│ Fax:                            │
│ Pin:                            │
│ Address 1: 123 Oak Lane         │
│ Address 2:                      │
│ City: Weymouth                  │
│ State/Province:                 │
│ Zip/Postal Code: DT4 9TH        │
│ Country: England                │
└─────────────────────────────────┘
```

New Contact — 150

Salutation: Dr.
First: John
Last: Smith
Email:
Company:
Title:
Work:
Home:
Mobile:
Pager:
Fax:
Pin:
Address 1: PO
Address 2:
City:
State/Province:
Zip/Postal Code:
Country:

*FIG.14*

New Contact — 150

Salutation: Dr.
First: John
Last: Smith
Email:
Co
Ti[ Do you wish to enter
Wo  a post office box in this
Ho             field ?
Mo
Pa     [ Yes ]    [ No ]
Fa
Pin:
Address 1:
Address 2:
City: Waterloo
State/Province:
Zip/Postal Code:
Country:

FIG.15

HANDHELD ELECTRONIC DEVICE PROVIDING ASSISTED ENTRY OF CONTACT INFORMATION, AND ASSOCIATED METHOD

BACKGROUND OF THE INVENTION

1. Field of the Invention

The invention relates generally to handheld electronic devices and, more particularly, to a handheld electronic device that provides assistance in entering information for a new or existing contact in an address book application of the handheld electronic device. The invention also relates to a method of providing such assistance to a user of a handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability, although many such handheld electronic devices are stand-alone devices that are functional without communication with other devices.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among these applications.

Most address book applications enable a user of the associated handheld electronic device to store several pieces of information for a given contact in a number of different fields. This, information may include, for example, the following fields: salutation, first name, last name, email address, company name, title, work, home, mobile, fax and pager numbers, address (often broken into two fields), city, state/province, ZIP/postal code, and country name, among others. In current address book applications, when a user wishes to enter a new contact for storage by the application, or enter information for an existing (already stored) contact, the information for the contact must be manually entered by the user of the handheld electronic device one field at a time using the input apparatus, such as a keyboard, that is provided with the handheld electronic device. None of the information that is input is used to facilitate the entry of information in another field or fields. As will be appreciated, depending on the amount of information to be entered, this process can be quite time consuming and at times inconvenient for the user. Thus, there is a need for a system and method for facilitating and simplifying the process required for a user to enter information for a new or existing contact into an address book application of a handheld electronic device.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

The invention relates to a method of facilitating the entry of information for a contact to be stored by an address book application of a handheld electronic device, wherein the information is entered into a plurality of fields. The method includes receiving first information in a first one of the fields, and determining whether the first information can be used to determine second information for entry in one of the fields. If it is determined that the first information can be used to determine the second information, the method includes entering the second information in either the first one of the fields or another one of the fields. The method may further includes a step of determining whether a user of the handheld electronic device wishes to enter the second information in either the first one of the fields or another one of the fields, such as through a prompt provided to the user. In this case, the entering step includes entering the second information in either the first one of the fields or another one of the fields only if it is determined that the user wishes to enter the second information in either the first one of the fields or another one of the fields.

In one embodiment, the first information is a name or abbreviation of a state/province, and the second information is a name or abbreviation of a country in which the state/province is located. In another embodiment, the first information is a (telephone) country code, and the second information is a name or abbreviation of a country that corresponds to the (telephone) country code. In yet another embodiment, the first information is a name or abbreviation of a country, and the second information is a country code that corresponds to the country. In this embodiment, the entering step may include entering the country code in the another one of the fields when a user of the handheld electronic device initiates the entry of information in the another one of the fields. The another one of the fields in this case is a field for entering a phone number. In still another embodiment, the first information includes a "P" and an "O" character, the second information includes text relating to a post office box, such as the text "P.O. Box", that is entered in the first one of the fields, and the handheld electronic device enters a numeric entry mode following entry of the second information in the first one of the fields to facilitate the entry of a box number. It is also possible to have the abbreviation actually shown in the address field to be "POB" if the user prefers that. And the text "Po" or the text "P.o" or "P.O" could be used to quickly trigger the expansion of the abbreviation into whatever form the user wishes the entry to be.

The invention also relates to a handheld electronic device having an address book application that includes a display, a processor, and a memory in electronic communication with the processor. The memory stores one or more routines executable by the processor for facilitating the entry of information for a contact to be stored by the address book application, wherein the information is entered into a plurality of fields displayed on the display. The one or more routines are adapted to implement the various embodiments of the method described above.

Figure 1:
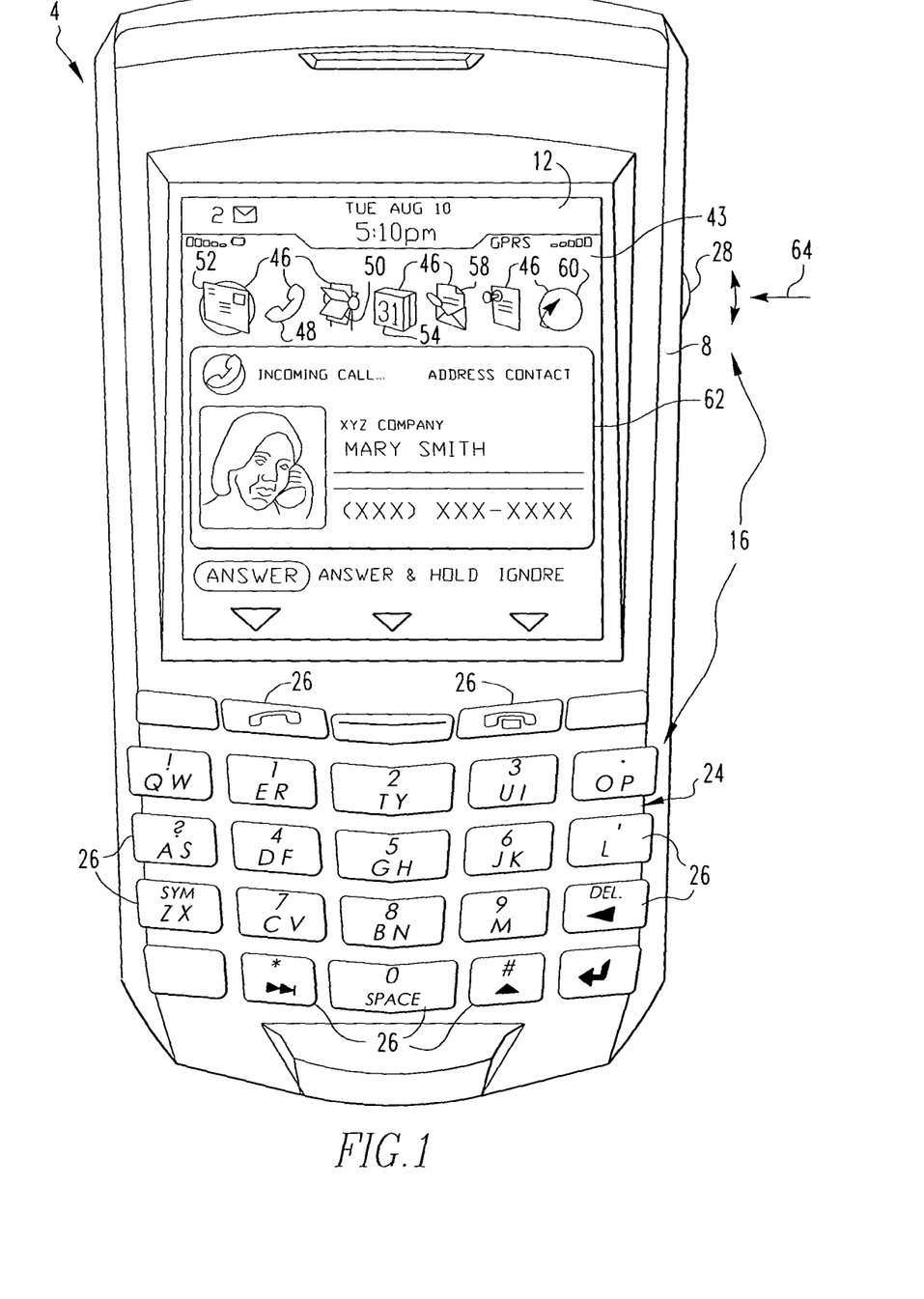
FIG. 1 is a front elevational view of an improved handheld electronic device in accordance with the invention.
Figure 2:
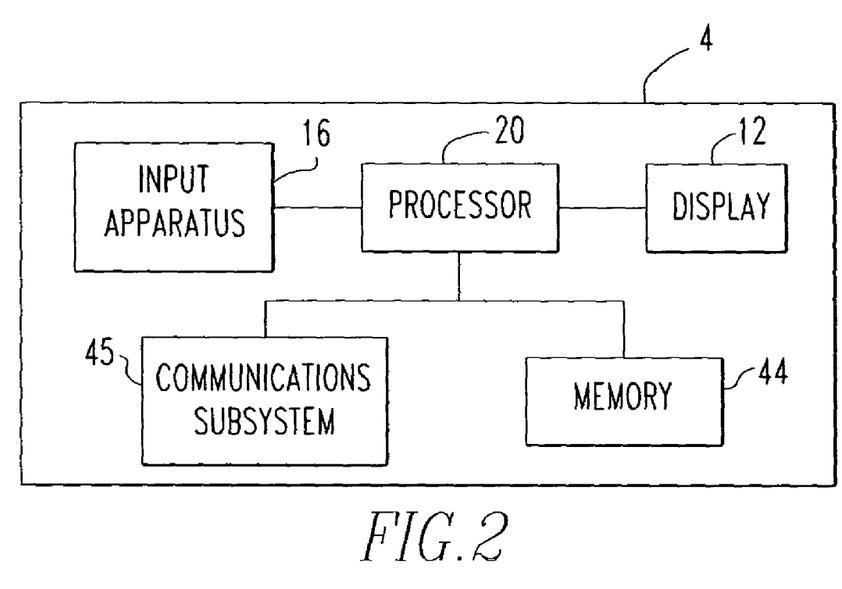
FIG. 2 is a block diagram of the handheld electronic device of FIG. 1.

An improved handheld electronic device 4 in accordance with the invention is depicted generally in FIGS. 1 and 2. The handheld electronic device 4 includes a housing 8, a display 12, an input apparatus 16, and a processor 20 (FIG. 2) which may be, without limitation, a microprocessor (µP). The processor 20 is responsive to inputs received from the input apparatus 16 and provides outputs to the display 12. Examples of handheld electronic devices are included in U.S. Pat. Nos. 6,452,588 and 6,489,950, which are incorporated by reference herein. The handheld electronic device 4 is of a type that includes a cellular telephone capability and, as will be described in greater detail below, provides an alert when additional user action following a request to initiate an outgoing phone call, such as through the depression of a <SEND> key or the like, is required to initiate a phone call. As used herein, the terms "phone" and "telephone" shall refer to any type of voice communication initiated and conducted over a wired and/or wireless network.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. Keys 26 include a <SEND> key 30 and an <END> key 32 for initiating and terminating phone calls. The keys 30, 32 may include suitable text and/or graphics (as shown) disposed (e.g., printed) thereon.

As is shown in FIG. 2, the processor 20 is in electronic communication with memory 44. Memory 44 can be any of a variety of types of internal and/or external storage media such as, without limitation, RAM, ROM, EPROM(s), EEPROM (s), and the like, that provide a storage register for data storage such as in the fashion of an internal storage area of a computer, and can be volatile memory or nonvolatile memory. The memory 44 further includes a number of routines executable by processor 20 for the processing of data. The routines can be in any of a variety of forms such as, without limitation, software, firmware, and the like, and shall include one or more subroutines, processes, procedures, function calls or the like, alone or in combination.

As is also shown in FIG. 2, processor 20 is in electronic communication with communications subsystem 45. Communications functions for handheld electronic device 4, including data and voice communications, are performed through communications subsystem 45. Communications subsystem 45 includes a transmitter and a receiver (possibly combined in a single transceiver component) and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobitex™, Dat TAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4.

In FIG. 1, the display 12 is depicted as displaying a home screen 43 that includes a number of applications depicted as discrete icons 46 (stored in memory 44 and executable by processor 20), including an icon representing a phone application 48, an address book application 50 for storing information for a plurality of contacts, a messaging application 52 which includes email, SMS and MMS applications, a calendar application 54, a memo application 56 for enabling a user to create documents and to record notes, lists and the like, a task application 58 for enabling a user to create and manage lists of tasks, and a browser application 60 for accessing and navigating the Internet.

In FIG. 1, the home screen 43 is currently active and would constitute a portion of an application. In addition, display 12 shown in FIG. 1 shows a dialog box 62 that indicates that there is currently a phone call coming into handheld electronic device 4. Dialog box 62 provides certain information relating to the incoming call, including, for example, the caller's phone number and identifying information if the caller and phone number are stored as a contact by address book application 50 of handheld electronic device 4. Other applications, such as phone application 48, address book application 50, messaging application 52, calendar application 54, memo application 56, task application 58 or browser application 60, can be initiated from the home screen 43 by providing an input through the input apparatus 16, such as by rotating the thumbwheel 28 and providing a selection input by translating the thumbwheel 28 in the direction indicated by the arrow 64 in FIG. 1.

As is known in the art, address book application 50 allows the user of handheld electronic device 4 to store contact related information for a number of contacts. That information is normally stored in a number of data fields and may include, among other things, a salutation to be used for the contact and the contact's first name, last name, email address, company name, title, work phone number, home phone number, mobile phone number, fax number, pager number, address (often broken into two fields), city, state/province, ZIP/postal code, and country name. As will be appreciated, certain information that is entered in one or more of such fields may suggest or indicate, in whole or in part, additional information that is appropriate for one or more other fields for the contact in question. For example, if a user of handheld electronic device 4 enters a state or province name when entering information for a new or existing contact, that state or province name may be used to determine the country name that should be entered for that contact. Similarly, if a country name is entered, it may be used to determine the appropriate country code to be used for phone numbers that are to be entered for the contact. Alternatively, if a phone number is entered that includes a country code, that country code can be used to determine the country name that should be entered for the contact. According to the invention, the ability to determine appropriate additional information for a contact based on information that has been previously entered is utilized to assist and facilitate the entry of information for a new or existing contact, thereby making the process simpler, quicker and more convenient.

Figure 3:
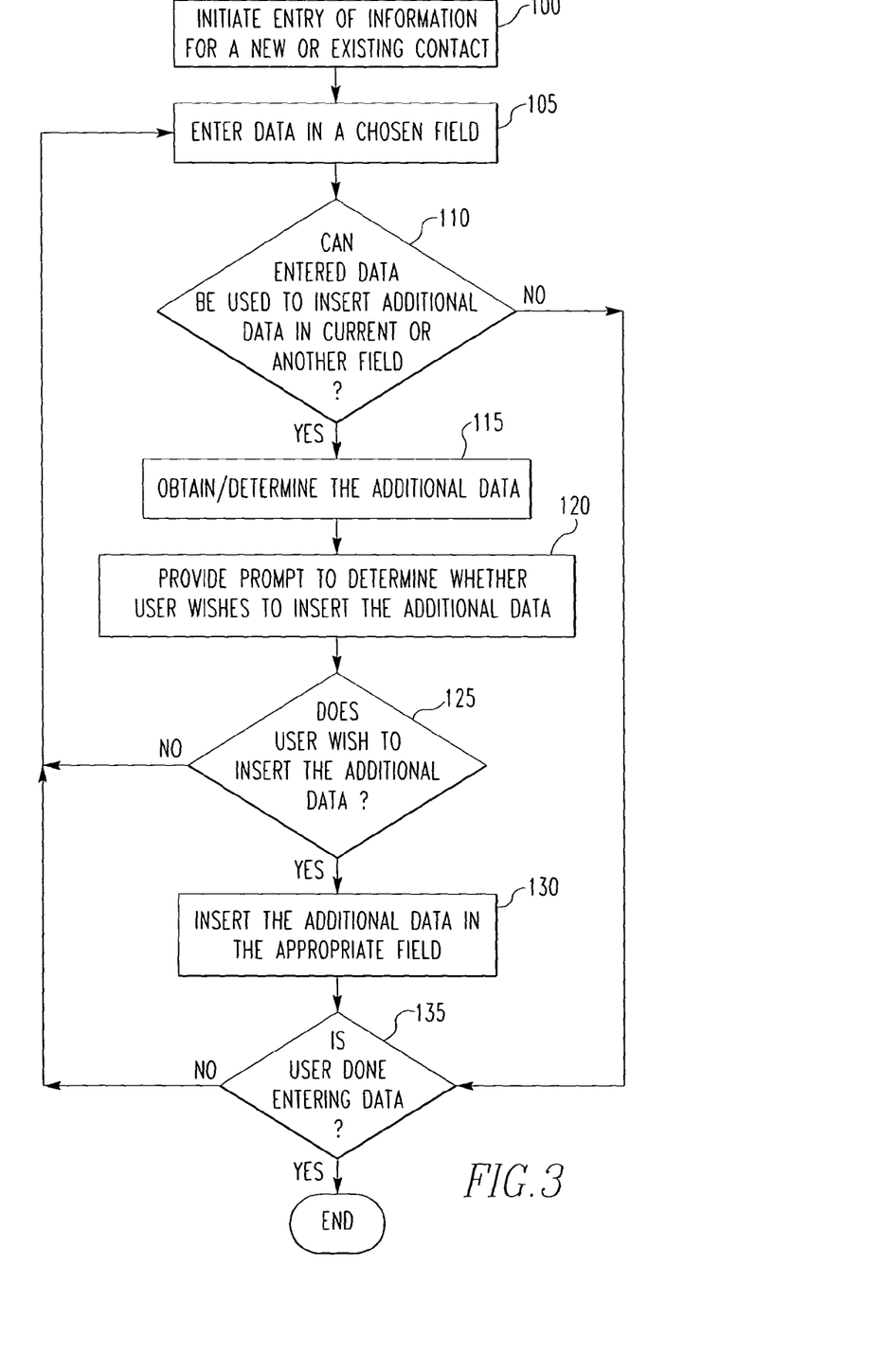
FIG. 3 is a flow chart of a method according to the invention for providing assistance in the entry of information for a contact to be stored by an address book application.

FIG. 3 is a flow chart of a method according to the invention for providing assistance in the entry of information for a new or existing contact to be stored by address book application 50. One or more particular routines that implement the method as generally described are preferably stored in memory 44 and are executable by processor 20. The method begins at step 100, where the entry of information for a new or existing contact is initiated by the user of handheld electronic device 4. This may be accomplished in any of a number of known ways, such as by accessing a menu provided by processor 20 on display 12 and choosing an "add new contact" or "edit contact" function therefrom. Next, at step 105, the user enters data for the contact in a chosen field, such as the contact's first name, last name, email address, etc. For example, this may be done by way of a new contact screen (such as those shown in FIGS. 4 through 15 shown and described below) that is provided by processor 20 on display 12 that enables the entry of information in particular fields using input apparatus 16. Alternatively, for existing contacts, a similar edit contact screen may be utilized. For ease of description, the Figures will correspond to the entry of information for a new contact, but it should be understood that the invention is not so limited, but instead may be used in connection with the entry of information for existing contact. Next, at step 110, a determination is made as to whether the data entered at step 105 can be used to automatically obtain/determine additional data for insertion in the current field or in another field. To do so, processor 20 may be adapted to recognize that certain predetermined information in certain predetermined fields can be utilized to determine appropriate additional information for the contact. For example, and without limitation, processor 20 may be adapted to recognize that when information is being input into the state/province field, it can be used to determine the appropriate country name for the contact. Other examples are provided below. If the answer at step 110 is no, meaning the entered data is not useful as described herein, the method proceeds to step 135 described below. If, however, the answer at step 110 is yes, meaning that the entered data may be used to determine additional information for the contact, then at step 115, the appropriate additional information is actually obtained. Typically, this is done by accessing and consulting an appropriate look-up table or the like (that relates to and corresponds to the entered information) stored in memory 44 to obtain the particular additional information that may inserted in the current or another field based on the entered information. For example, the memory 44 may store a look-up table or the like that stores a plurality of state/province names and corresponding country names and/or abbreviations, or the memory 44 may store a look-up table or the like that stores the country codes for each particular country that may be entered in a country name field. As used herein, the term state/province shall refer to a state, a province, or any other similar subdivision of a country.

Next, in the preferred embodiment, at step 120, a prompt is displayed on display 12 that asks the user whether he or she wishes to actually insert the additional information or data that was obtained at step 115 in a particular field for storage in connection with the new contact. At step 125, a determination is then made as to whether the user wishes to insert the additional information. If the answer is no, then the method returns to step 105, where the user continues to enter data into a chosen field. If the answer at step 125 is yes, then, at step 130, the additional information is inserted in the appropriate field. As an alternative, the method may skip steps 120 and 125, and proceed directly to step 130. At step 135, a determination is made as to whether the user has finished entering data for the new contact. Typically, a user will indicate that he or she is finished entering data for a contact by accessing a menu on display 12 and choosing a "save contact" function or the like. If the answer at step 135 is yes, then the method ends. If the answer at step 135 is no, then the method returns to step 105, where the user continues to enter data into a chosen field.

Thus, the method shown generally in FIG. 3 simplifies, facilitates and quickens the process for entering information for a new or existing contact into address book application 50 by checking information as it is entered in various fields, and, as appropriate, using that information to automatically fill in, completely or partially, that or another field.

FIGS. 4 through 15 show several exemplary new contact entry screens 150 (displayed on display 12) that illustrate the implementation of the method shown in FIG. 3. As seen in FIGS. 4 through 15, each new contact screen 150 includes a plurality of fields 155 in which a user may selectively enter particular information for a new contact. As described above, the use of a new contact screen in the Figures is merely illustrative of the invention, and similar screens fro entering information for existing contacts may also be used.

Figure 4:
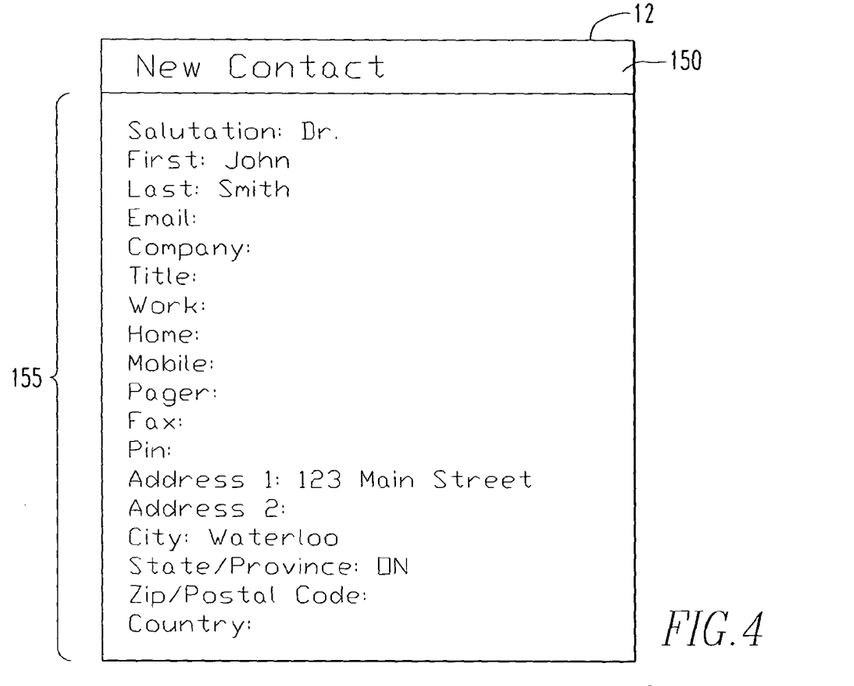
FIGS. 4 through 15 show several exemplary new contact entry screens (displayed on the display shown in FIGS. 1 and 2) that illustrate the implementation of the method shown in FIG. 3.
Figure 5:
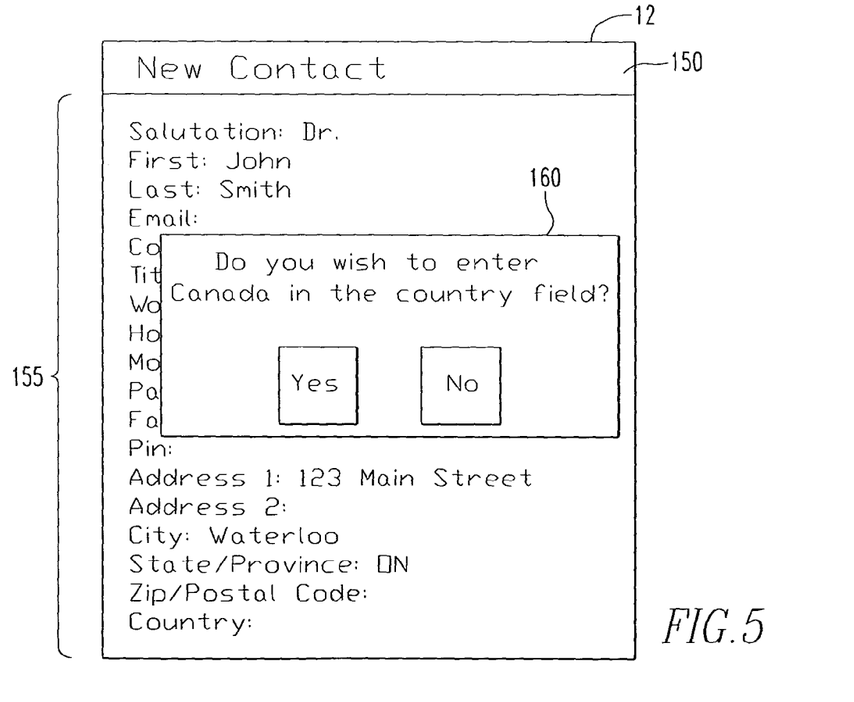
Figure 6:
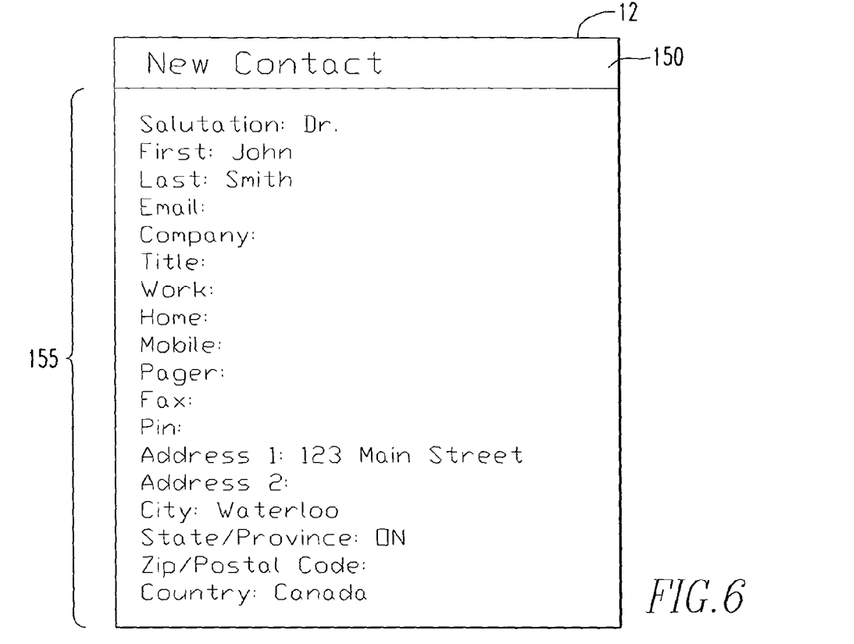

FIGS. 4, 5 and 6 illustrate a situation where a user has entered state/province data for a new contact and, based thereon, the country name field is automatically filled in. Specifically, as seen in FIG. 4, "ON," which stands for Ontario, Canada, has been entered in the state/province field of new contact entry screen 150. In FIG. 5, a dialog box 160 is provided on new contact entry screen 150 that displays a prompt which asks the user whether he or she wishes to enter "Canada" in the country name field of new contact entry screen 150. Dialog box 160 enables the user to select either "yes" or "no" in a known manner using input apparatus 16. FIG. 6 shows new contact entry screen 150 wherein "Canada" has been automatically entered in the country name field (in response to a "yes" selection from dialog box 160).

Figure 7:
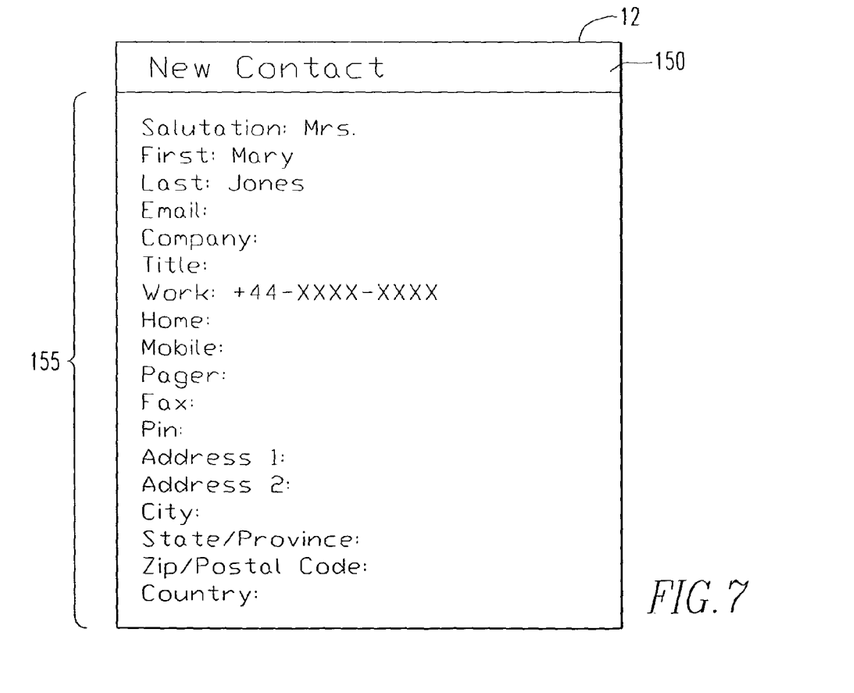
Figure 8:
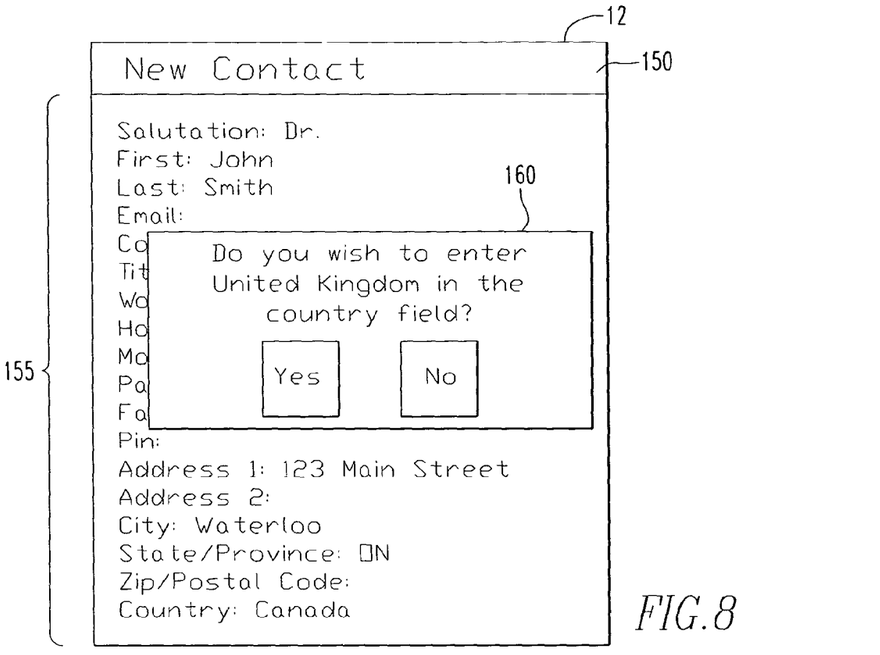
Figure 9:
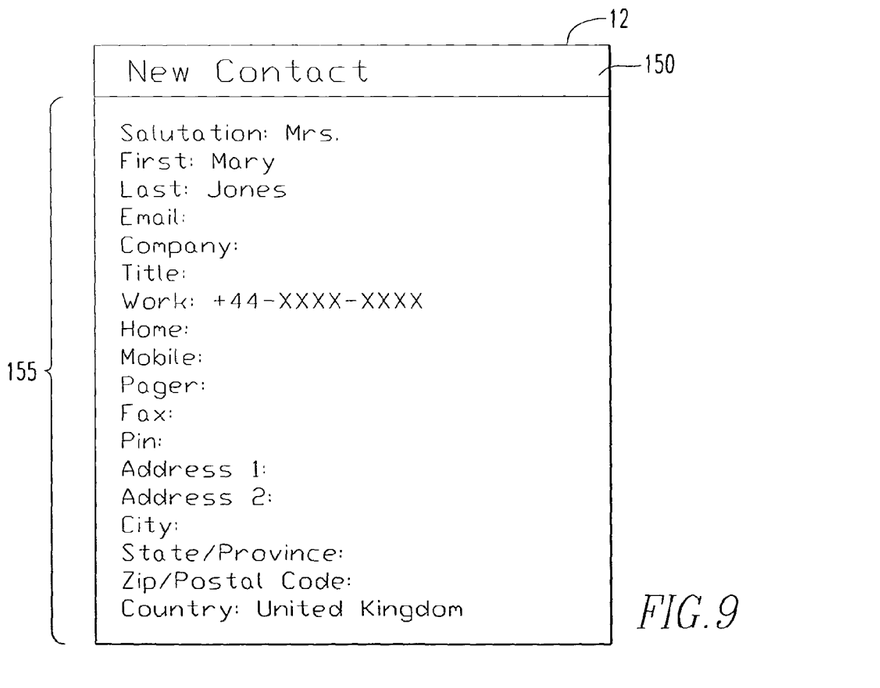

FIGS. 7, 8 and 9 illustrate a situation where a user has entered a work phone number including a country code for a new contact and, based thereon, the country name field is automatically filled in. Specifically, as seen in FIG. 7, "+44-XXXX-XXXX" has been entered in the work phone number field of new contact entry screen 150. The country code portion of the work phone number is +44, which is the country code for the United Kingdom. In FIG. 8, dialog box 160 is provided on new contact entry screen 150, and displays a prompt which asks the user whether he or she wishes to enter "United Kingdom" in the country name field of new contact entry screen 150. FIG. 9 shows new contact entry screen 150 wherein "United Kingdom" has been automatically entered in the country name field (in response to a "yes" selection from dialog box 160).

Figure 10:
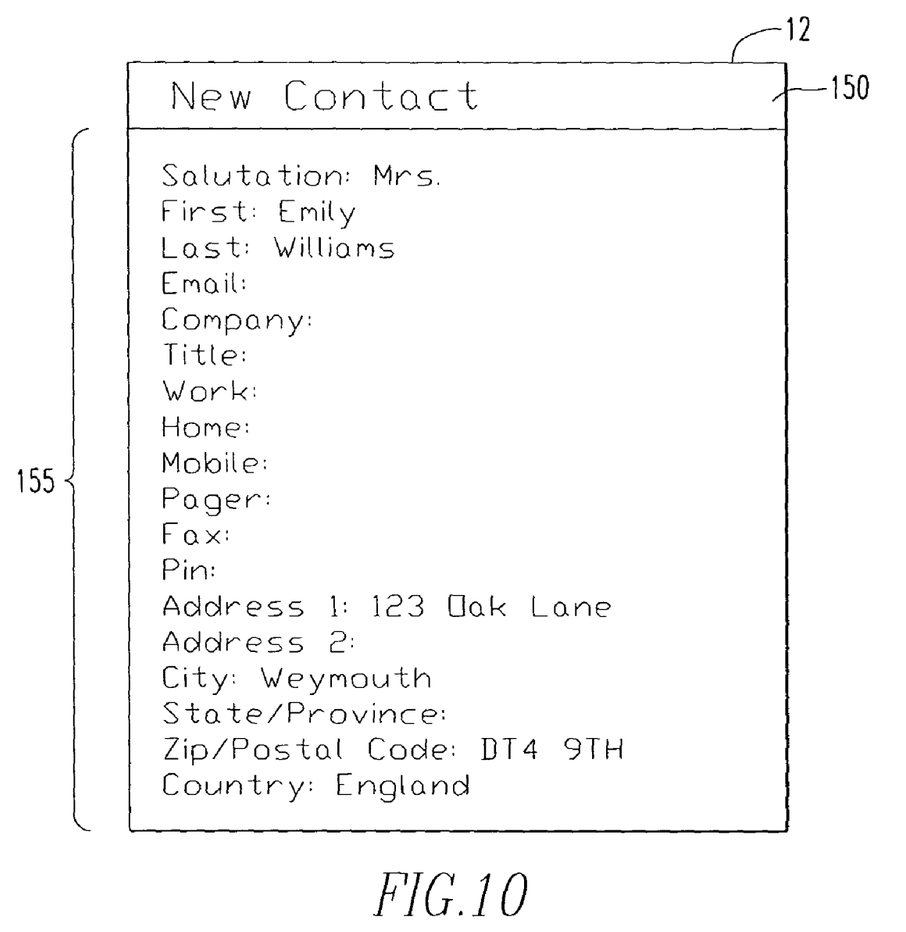
Figure 11:
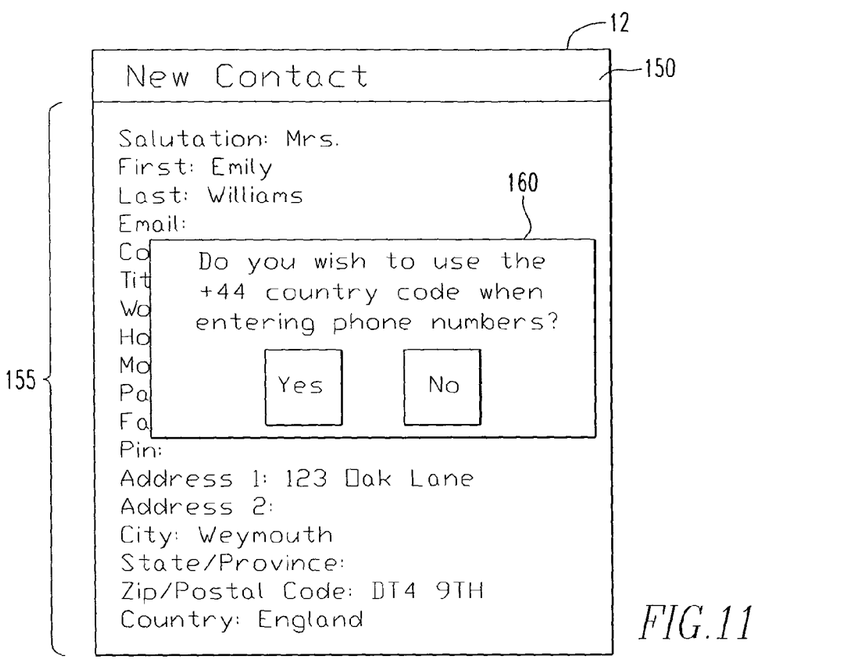
Figure 12:
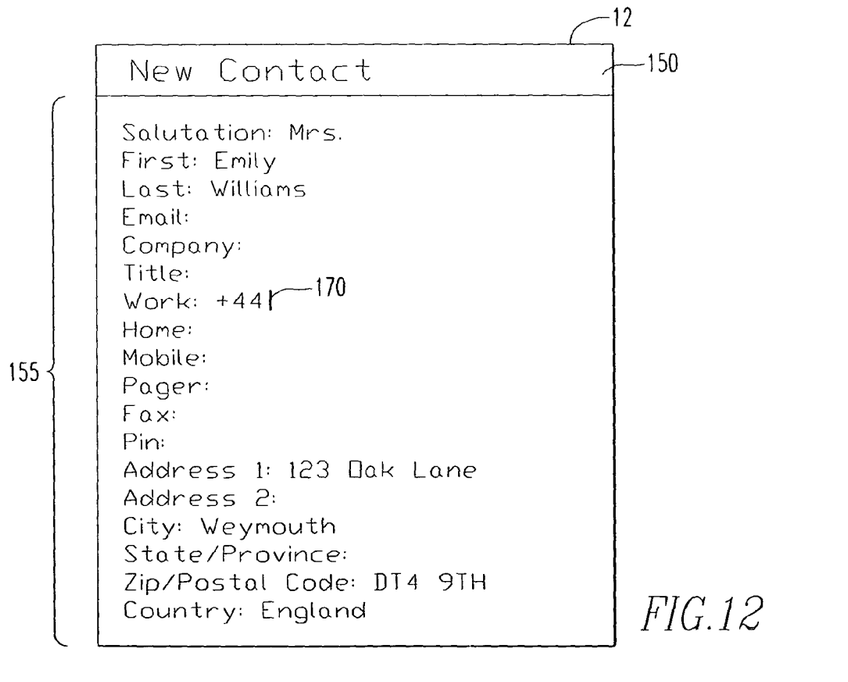

FIGS. 10, 11, and 12 illustrate a situation where a user has entered an address including a country name for a new contact and, based thereon, the appropriate country code is automatically filled in when phone numbers are entered in appropriate fields. Specifically, as seen in FIG. 10, an address including "England" in the country name field has been entered by user in the new contact entry screen 150. In FIG. 11, dialog box 160 is provided on new contact entry screen 150, and displays a prompt which asks the user whether he or she wishes to use the country code "+44" when phone numbers are entered. In this embodiment, when a user selects "yes" from dialog box 160, the country code will be stored and automatically entered whenever the user enters data into a phone number field (e.g., work, home, mobile, fax) as seen in FIG. 12. The cursor 170 is automatically placed after the country code so that the user can begin entering the rest of the phone number following the country code.

Figure 13:
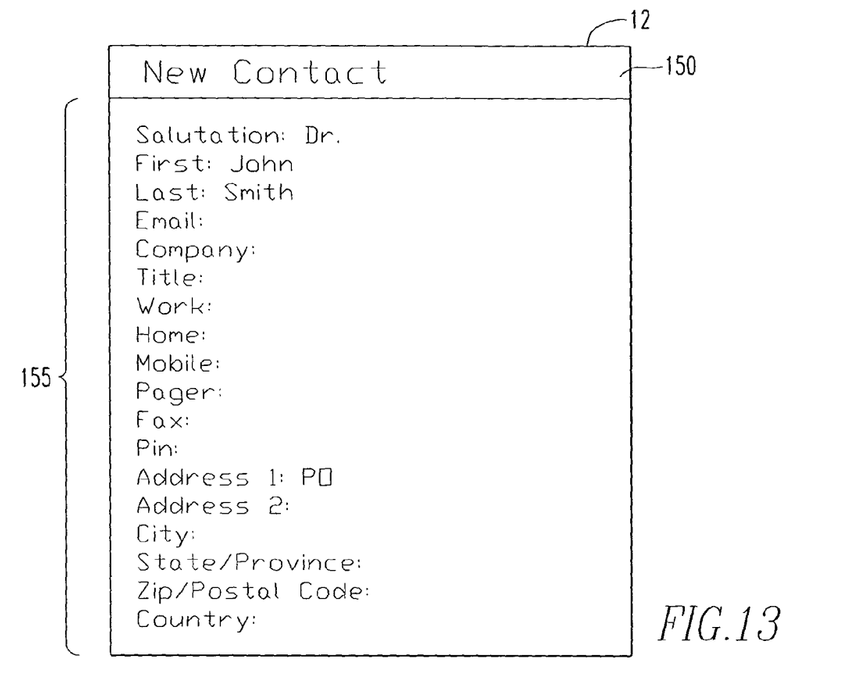
Figure 14:
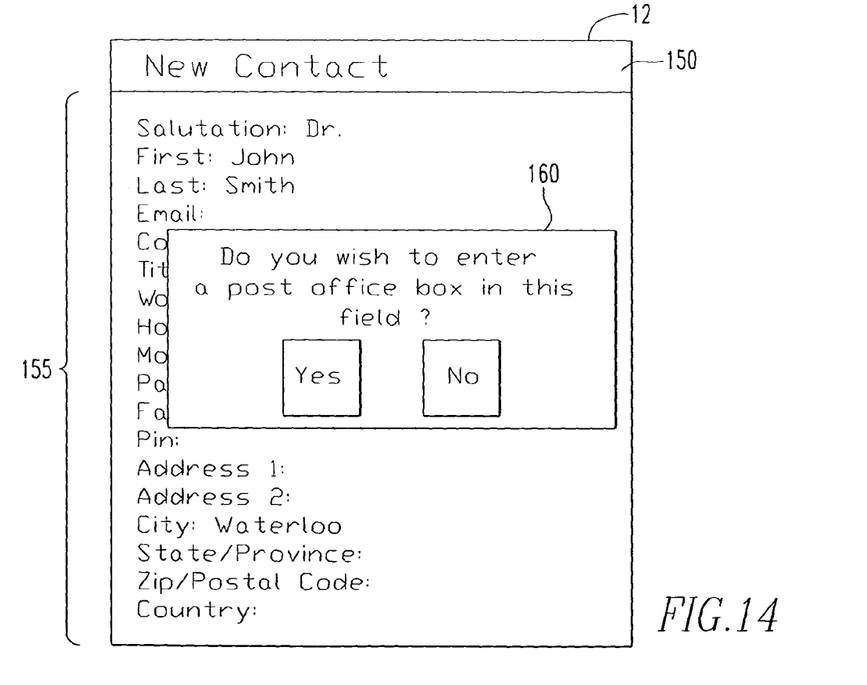
Figure 15:
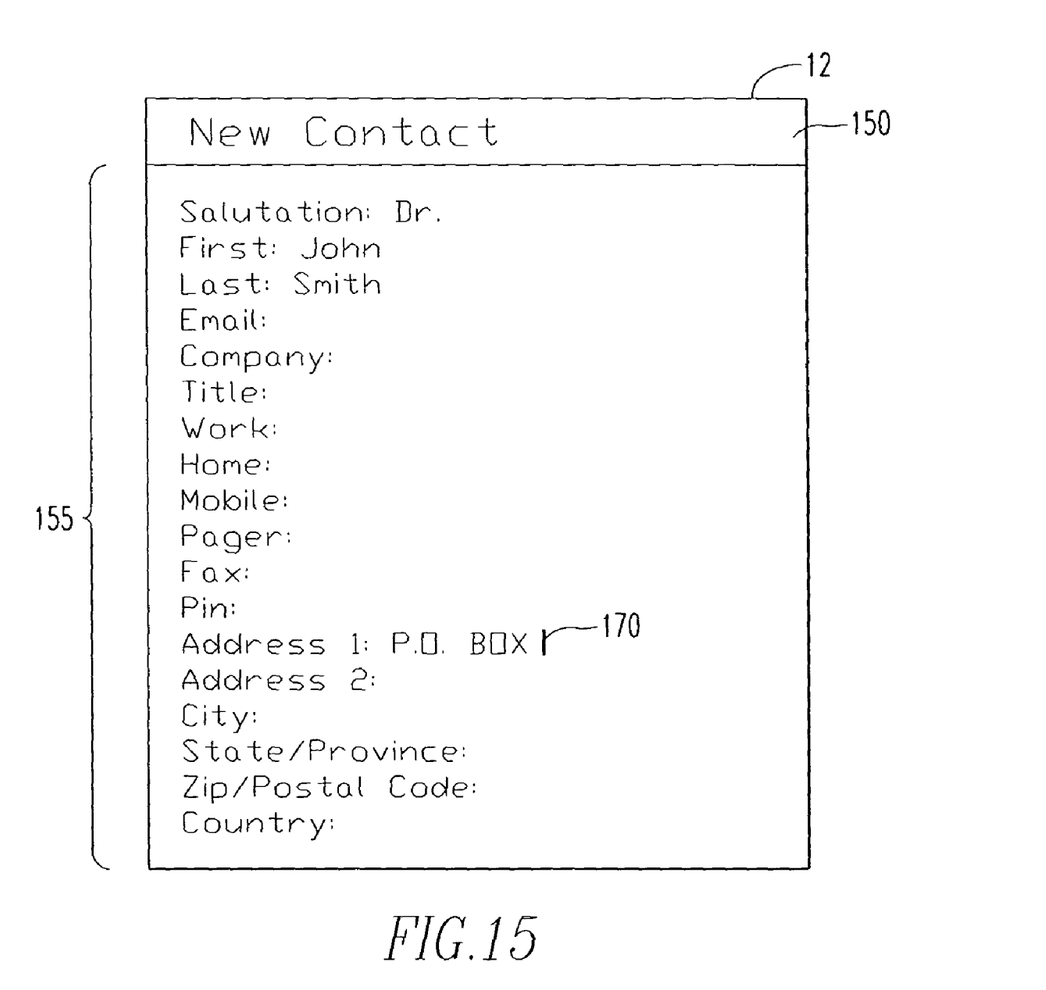

FIGS. 13, 14, and 15 illustrate a situation where a user is entering an address for a new contact that includes a post office box. Specifically, as seen in FIG. 13, the letters "PO" (or "po" or "Po", etc) have been entered in the address 1 field in the new contact entry screen 150. In FIG. 14, dialog box 160 is provided on new contact entry screen 150, and displays a prompt which asks the user whether he or she wishes to enter a post office box in the current field (in response to the entry of letters "PO" (or "po" or "Po", etc). In this embodiment, when a user selects "yes" from dialog box 160, the text "P.O. Box" will be automatically entered in the address 1 field as seen in FIG. 15. The cursor 170 is automatically placed after the text "P.O. Box" so that the user can enter the post office box number. Preferably, handheld electronic device 4 shifts to a numeric entry mode at this point wherein any key that is pressed that includes both a letter and a number (e.g., the "ER1" key 26 in FIG. 1) will result in the entry of the number rather than the letter. As is known, under normal circumstances, a user typically needs to simultaneously press an <ALT> or <SHIFT> key in order to have a number input when a key that includes both a letter(s) and a number is pressed.

According to a further aspect of the invention, an override feature may be provided to override or stop the assisted entry of information as described herein so that a user may merely manually enter desired information without the actions described herein taking place. For example, and without limitation, a user my hit a backspace key provided on handheld electronic device 4 twice to trigger the override feature.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of facilitating the entry of information for a contact to be stored by an address book application of a handheld electronic device, the method comprising:
providing on a display of said handheld electronic device, a contact data entry screen having a plurality of fields for receiving data to be stored by said address book application in association with said contact; receiving at the handheld electronic device while it is in an alphanumeric entry mode first information in a first one of said fields of said contact data entry screen;
determining whether said first information includes a "P" and an "O" characters;
if it is determined that said first information includes a "P" and an "O" characters, then automatically:
entering a text string "P.O. Box" or a derivative of the text string "P.O. Box", in said first one of said fields;
placing a cursor after the text string; and
shifting the handheld electronic device from the alphanumeric entry mode to a numeric entry mode for manual entry of a post office box number in said first one of said fields.

2. The method according to claim 1, further comprising determining whether an override feature has or has not been triggered, and performing said steps of determining whether said first information can be used to determine second information and of entering said second information only if it is determined that said override feature has not been triggered.

3. A handheld electronic device having an address book application, comprising:
a display;
a processor; and
a memory in electronic communication with said processor, said memory storing one or more routines executable by said processor for facilitating the entry of information for a contact to be stored by said address book application, said one or more routines being adapted to:
provide a contact data entry screen on said display, said contact data entry screen having a plurality of fields for receiving data to be stored by said address book application in association with said contact;
receive first information in a first one of said fields of said contact data entry screen while said handheld electronic device is in an alphanumeric entry mode;
determine whether said first information includes a "P" and an "O" characters;
if it is determined that said first information includes a "P" and an "O" characters, then automatically:
enter a text string "P.O. Box" or a derivative of the text string "P.O. Box", in said first one of said fields;
place a cursor after the text string; and
shift the handheld electronic device from the alphanumeric entry mode to a numeric entry mode for manual entry of a post office box number in said first one of said fields.

4. The handheld electronic device according to claim 3, wherein said routines are further adapted to determine whether an override feature has or has not been triggered, and wherein said routines determine whether said first information can be used to determine second information and enter said second information only if it is determined that said override feature has not been triggered.

5. The method according to claim 1, wherein the first information including the "P" and the "O" character is case-insensitive.

6. The method according to claim 1, wherein when the first information includes the "P" and the "O" character, automatically expanding an abbreviation associated with the first information to a predetermined form.

7. The method according to claim 1 further comprising, providing a prompt on the display of said handheld electronic device requesting said second information.

8. The method according to claim 1, wherein the numeric entry mode comprises a mode in which said handheld electronic device determines that a number is entered when any key on said device that includes both a letter and a number is pressed.

9. The handheld electronic device according to claim 3, wherein the first information including the "P" and the "O" character is case-insensitive.

10. The handheld electronic device according to claim 3, wherein when the first information includes the "P" and the "O" character, automatically expanding an abbreviation associated with the first information to a predetermined form.

11. The handheld electronic device according to claim 3, wherein said routines are further adapted to provide a prompt on the display of said device requesting said second information.

12. The handheld electronic device according to claim 3, wherein the numeric entry mode comprises a mode in which said handheld electronic device determines that a number is entered when any key on said device that includes both a letter and a number is pressed.

13. A tangible computer program product comprising computer-readable medium having non-transitory computer-readable code embodied therein executable by a processor of a handheld electronic device having a memory and an address book application to cause the handheld electronic device to facilitate entry of information for a contact to be stored by the address book application, said computer-readable code being adapted to:

provide a contact data entry screen on said display, said contact data entry screen having a plurality of fields for receiving data to be stored by said address book application in association with said contact;

receive first information in a first one of said fields of said contact data entry screen while said handheld electronic device is in an alphanumeric entry mode;

determine whether said first information includes a "P" and an "O" characters;

if it is determined that said first information includes a "P" and an "O" characters, then automatically:
  enter a text string "P.O. Box" or a derivative of the text string "P.O. Box", in said first one of said fields;
  place a cursor after the text string; and
  shift the handheld electronic device from the alphanumeric entry mode to a numeric entry mode for manual entry of a post office box number in said first one of said fields.

14. The tangible computer program product according to claim 13, wherein said computer-readable code is further adapted to determine whether an override feature has or has not been triggered, and to determine whether said first information can be used to determine second information and enter said second information only if it is determined that said override feature has not been triggered.

15. The tangible computer program product according to claim 13, wherein the first information including the "P" and the "O" character is case-insensitive.

16. The tangible computer program product according to claim 13, wherein when the first information includes the "P" and the "O" character, said computer-readable code being further adapted to automatically expand an abbreviation associated with the first information to a predetermined form.

17. The tangible computer program product according to claim 13, wherein said computer-readable code is further adapted to provide a prompt on the display of said device requesting said second information.

18. The tangible handheld electronic device according to claim 13, wherein the numeric entry mode comprises a mode in which said handheld electronic device determines that a number is entered when any key on said device that includes both a letter and a number is pressed.

* * * * *

UNITED STATES PATENT AND TRADEMARK OFFICE
CERTIFICATE OF CORRECTION

| | | |
|---|---|---|
| PATENT NO. | : 8,010,610 B2 | Page 1 of 1 |
| APPLICATION NO. | : 11/196363 | |
| DATED | : August 30, 2011 | |
| INVENTOR(S) | : George Baldwin Bumiller | |

It is certified that error appears in the above-identified patent and that said Letters Patent is hereby corrected as shown below:

Column 10, claim 18, line 16, delete ""handheld electronic device" and insert therefor -- computer program product --.

Signed and Sealed this
Seventeenth Day of April, 2012

David J. Kappos
*Director of the United States Patent and Trademark Office*